(12) United States Patent
Sethi (10) Patent No.: US 12,405,863 B2
(45) Date of Patent: Sep. 2, 2025

(54) METHOD AND SYSTEM FOR MANAGING FAILURE EVENTS OF A RECOVERY PROCESS USING A RECOVERY MODULE

(71) Applicant: Dell Products L.P., Round Rock, TX (US)

(72) Inventor: Parminder Singh Sethi, Ludhiana (IN)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 18/193,248

(22) Filed: Mar. 30, 2023

(65) Prior Publication Data
US 2024/0330125 A1  Oct. 3, 2024

(51) Int. Cl.
*G06F 11/14* (2006.01)
*G06F 11/07* (2006.01)

(52) U.S. Cl.
CPC ...... *G06F 11/1469* (2013.01); *G06F 11/0793* (2013.01); *G06F 11/1464* (2013.01); *G06F 11/0709* (2013.01)

(58) Field of Classification Search
CPC .. G06F 11/0793; G06F 11/079; G06F 11/203; G06F 3/0647; G06F 16/119; G06F 16/214
See application file for complete search history.

(56) References Cited

U.S. PATENT DOCUMENTS

| | | | |
|---|---|---|---|
| 7,805,583 B1 * | 9/2010 | Todd | G06F 3/0647 711/161 |
| 8,533,815 B1 | 9/2013 | Upson et al. | |
| 8,751,878 B1 * | 6/2014 | Don | G06F 11/2094 714/55 |
| 10,509,696 B1 * | 12/2019 | Gilderman | G06F 11/0727 |
| 2007/0245110 A1 * | 10/2007 | Shibayama | G06F 3/067 711/165 |
| 2008/0288560 A1 * | 11/2008 | Kaji | G06F 3/067 |
| 2009/0164853 A1 * | 6/2009 | Gokhale | G06F 11/0769 714/57 |
| 2010/0049917 A1 * | 2/2010 | Kono | G06F 3/0605 711/E12.019 |
| 2010/0088396 A1 | 4/2010 | Armerding | |
| 2010/0293412 A1 * | 11/2010 | Sakaguchi | G06F 11/0715 711/E12.001 |
| 2011/0276821 A1 * | 11/2011 | Gudlavenkatasiva | G06F 11/0751 714/48 |

(Continued)

*Primary Examiner* — Gabriel Chu
(74) *Attorney, Agent, or Firm* — Chamberlain, Hrdlicka, White, Williams & Aughtry; Aly Z. Dossa (57) ABSTRACT

A system for remediating a recovery process such as a migration of data includes an event database, a monitoring component, programmed to: monitor a source device to detect an initiation of a recovery process, wherein the recovery process is migration of application data from the source device to a target device, an analysis component programmed to: monitor the event database to detect a new event entry, wherein the event entry is associated with the recovery process of the source device, make a determination that the new event entry is associated with a failure event, based on the determination, provide the new event entry to a remediating component, programmed to obtain a recommendation for remediation based on the failure event and initiate the remediation based on the recommendation for remediation.

6 Claims, 7 Drawing Sheets

(56) References Cited

U.S. PATENT DOCUMENTS

| | | | |
|---|---|---|---|
| 2011/0314470 A1* | 12/2011 | Elyashev | G06F 11/1484 |
| | | | 718/1 |
| 2013/0268807 A1* | 10/2013 | Spencer | G06F 11/1415 |
| | | | 714/18 |
| 2013/0318497 A1* | 11/2013 | Tal | G06F 8/65 |
| | | | 717/121 |
| 2015/0046352 A1 | 2/2015 | Blitz et al. | |
| 2018/0032280 A1* | 2/2018 | Feigin | G06F 3/061 |
| 2018/0302226 A1 | 10/2018 | Heimlicher et al. | |
| 2020/0226144 A1 | 7/2020 | Chen | |
| 2021/0192366 A1 | 6/2021 | Kadambi | |
| 2021/0374013 A1 | 12/2021 | Prasad | |
| 2021/0397495 A1 | 12/2021 | Prakash | |
| 2023/0281219 A1 | 9/2023 | Lee | |
| 2023/0289325 A1 | 9/2023 | Kurian | |

\* cited by examiner

METHOD AND SYSTEM FOR MANAGING FAILURE EVENTS OF A RECOVERY PROCESS USING A RECOVERY MODULE

BACKGROUND

Computing devices in a system may include any number of hardware resources such as processors, memory, and persistent storage. The computing devices may utilize the hardware resources to host applications and/or other logical devices. Data may be migrated from one logical device to another.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a method for tracking events of a recovery process in accordance with one or more embodiments of the invention.

FIG. 2.2 shows a method for analyzing and remediating a failure event in accordance with one or more embodiments of the invention.

FIGS. 3.1-3.3 show example use cases in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to a method and system for managing logical devices. Specifically, embodiments relate to methods and systems for managing a self-recovery of a logical device.

In a production host environment, for a logical device such as a server device (also referred to as a "server" or a "node") that is deployed, many other logical devices can connect to the server and transfer data to the server. The recovery process for a logical device includes performing methods for restoring the processing and storage of a logical device to a stable state. The stable state may be associated with a corresponding amount of computing resources (e.g., processing) and data stored by the logical device. For example, the logical device may perform a migration of data, configurations, and/or any other state information of the logical device (or "node") to a second logical device.

Embodiments disclosed herein include utilizing a recovery module attached to a network layer of the logical devices. This recovery module may coordinate with the two logical devices to orchestrate the completion of a recovery process. The recovery module may include a monitoring component that includes functionality for detecting the initiation of the recovery process and monitor the transfer of data associated with the recovery process and generate event entries to track the progress of the recovery process. The event entries may each be associated with an event of the recovery process. Examples of events tracked in the activity logs may include, for example, a packet being dropped, a network connectivity issue, a percentage of data left to be transmitted, and a failure of the source logical device. The event entries may be stored in an event database managed by the recovery module.

The recovery module may further include an analyzing component that analyzes the event entries to determine if a failure event occurs. The failure event may be an indication that the migration process failed. This may be caused by a premature failure of the old device migrating the data, a number of packets dropped exceeds a predetermined threshold, and/or a failure to reestablish a connection between the source device and the target device.

Based on the determination that a failure event occurs, the analyzing component notifies a remediating component of the detected failure event. The remediating component initiates one or more recommendations for remediating the failure event. Examples of recommendations initiated by the remediating component include, but are not limited to: (i) providing a list to the source device for other potential target devices to continue, or re-initiate, the self-recovery process, (ii) identifying an alternative network path to reestablish the connection, (iii) updating a self-recovery policy, implemented by the source node, to specify increasing the list of target devices used for the recovery process, (iv) adjusting the packet size of each packet sent during the migration, and (v) adjusting the data to be completed during the migration.

The remediating component includes functionality for remediating the migration process. For example, the remediating component may include functionality for reestablishing the connection of the source device and the target device, for providing the alternative network path to the source device, for providing the network paths to the additional target devices, and/or to send a packet adjustment request to the source device. The remediating component may include other methods for remediating the data migration without departing from the invention. Further, the recovery module may include other functionalities without departing from the invention.

The following describes various embodiments of the invention.

Figure 1:
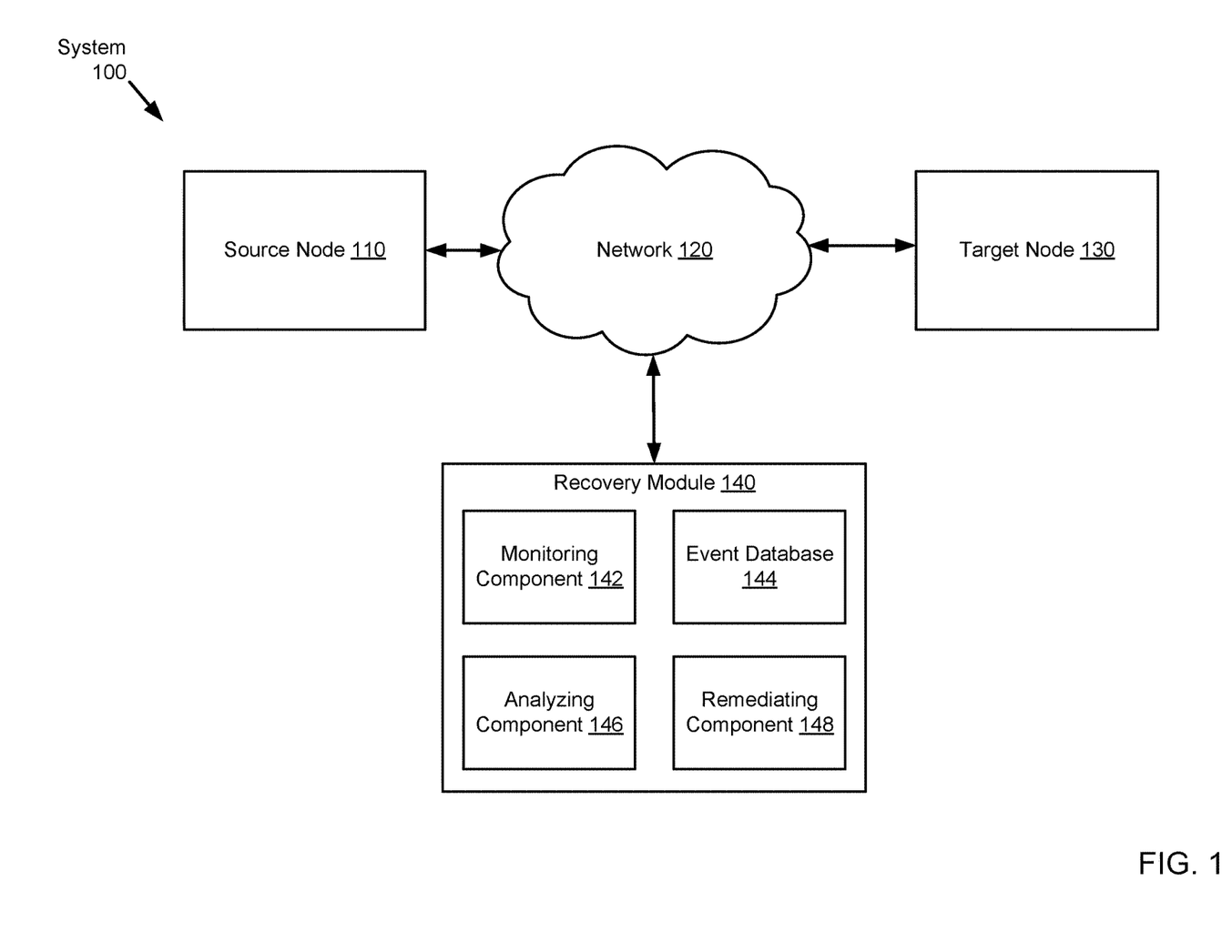
FIG. 1 shows a diagram of a system in accordance with one or more embodiments of the invention.

FIG. 1 shows a diagram of a system (100) in accordance with one or more embodiments of the invention. The system (100) includes a network (120), a source node (110), a target node (130), and a recovery module (140). The system (100) may include additional, fewer, and/or different components without departing from the scope of the invention. For example, the source node (110) may be utilized by clients (not shown). Each component may be operably connected to any of the other components via any combination of wired and/or wireless connections. Each component illustrated in FIG. 1 is discussed below.

In one or more embodiments, the source node (110), the recovery module (140), and the target node (130) may be physical or logical devices, as discussed below. In one or more embodiments, the system (100) may include any number of source nodes and any number of target nodes without departing from the scope of the invention. In one or more embodiments, the source nodes may collectively be referred to as "a source environment". Similarly, in one or more embodiments, the target nodes may collectively be referred to as "a target environment".

While FIG. 1 shows a specific configuration of the system (100), other configurations may be used without departing from the scope of the invention. For example, although the clients and the nodes (the source node (110), the target node (130)) are shown to be operatively connected through the network (120), the clients and the nodes (110, 130) may be directly connected, without an intervening network (e.g., 120). As yet another example, although the source node (110) and the target node (130) are shown to be connected via the network (120), the source node (110) and the target node (130) may be executing on the same environment (e.g., a production host environment).

Further, the functioning of the clients and the nodes (110, 130) is not dependent upon the functioning and/or existence of the other device(s) in the system (100). Rather, the recovery module (140) and the nodes (110, 130) may function independently, and perform operations locally that do not require communication with other devices. Accordingly, embodiments disclosed herein should not be limited to the configuration of devices and/or components shown in FIG. 1.

In one or more embodiments, the system (100) may deliver computing power and storage capacity as a service to users of the clients via the network (120). The system (100) may also represent a comprehensive middleware layer running on computing devices (e.g., 400, FIG. 4) that supports virtualized application environments. In one or more embodiments, the system (100) may support a virtual machine (VM) environment, and may map capacity requirements (e.g., computational load, storage access, etc.) of VMs and supported applications to available resources (e.g., processing resources, storage resources, etc.) managed by the environments (e.g., 110, 130). Further, the system (100) may be configured for workload placement collaboration and computing resource (e.g., processing, storage/memory, virtualization, networking, etc.) exchange.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

In one or more embodiments, as being a physical computing device or a logical computing device (e.g., a VM), the source node (110) may be configured for hosting and maintaining various workloads, or for providing a computing environment (e.g., computing power and storage) whereon workloads may be implemented. The source node (110) may also exchange data with other nodes (e.g., other source nodes, target nodes, etc.) registered in/to the network (120) in order to, for example, participate in a collaborative workload placement. For example, the source node (110) may split up a request (e.g., an operation, a task, an activity, etc.) with another source node, coordinating its efforts to complete the request (e.g., to generate a response) more efficiently than if the source node (110) had been responsible for completing the request.

One of ordinary skill will appreciate that the source node (110) may perform other functionalities without departing from the scope of the invention. Examples of the source node (110) may include (but not limited to): an enterprise server, a modular server, a blade server, a mainframe, a workstation computer, etc. In one or more embodiments, the source node (110) may be a heterogeneous set, including different types of hardware components and/or different types of operating systems (OSs).

In one or more embodiments, a workload (not shown) may refer to a physical or logical component configured to perform certain work functions. Workloads may be instantiated (e.g., initiated, executed, etc.) and may be operated while consuming computing resources allocated thereto. Examples of a workload may include (but not limited to): a VM, a container, a database, an application, a collection of microservices, etc.

As used herein, a "server" may provide computer-implemented services (e.g., receiving a request, sending a response, etc.) to the users. In one or more embodiments, the request may be, for example (but not limited to): a web browser search request, a REST request, a computing request, a database management request, etc. To provide the computer-implemented services to the users, the server may perform computations locally and/or remotely. By doing so, the server may utilize different computing devices (e.g., 400, FIG. 4) that have different quantities of computing resources (e.g., processing cycles, memory, storage, etc.) to provide a consistent user experience to the users.

As used herein, a "database" is an organized collection of structured data, typically stored in a computing system. In most cases, a database is controlled by a database management system, in which the data and the database management system (along with the applications that are associated with them) are referred to as a "database system". Data within the database system (simply "database") is typically modeled in rows and columns in a series of tables to make processing and querying efficient. Most databases use structured query language (SQL) for writing and querying data.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the amount of central processing unit (CPU), memory, and disk that those processes have access to.

Comparing to a VM, a container does not need to include a guest OS in every instance and may simply leverage the features and resources of a host OS. For example, instead of virtualizing the underlying hardware components, a container virtualize the OS, so the container includes only the application (and its libraries and dependencies). The absence of the guest OS makes a container lightweight, fast, and portable.

In one or more embodiments, as being a stateful environment with stateful representational state transfer application programming interfaces (stateful REST APIs) (where the APIs of the same application(s) are interdependent), the source node (110) may include any number of applications (and/or content accessible through the applications) that provide stateful, computer-implemented application services to a user. Applications may be designed and configured to perform one or more operations (e.g., functions, tasks, activities, etc.) instantiated by a user of the source node (110). Examples of an application may include (but not limited to): a word processor, a media player, a web browser, a file viewer, an image editor, etc.

In one or more embodiments, application services may include, for example (but not limited to): database services, electronic communication services, instant messaging services, file storage services, web-based services, desktop-based services, a workload placement collaboration, serving (e.g., processing) a request, sharing an application log, receiving computing resource details of a node, transmitting a request, analyzing data, streaming video, etc.

In order to provide the above-mentioned application services, each application may host similar or different components. The components may be, for example (but not limited to): instances of databases, instances of email servers, etc. Applications may be executed on one or more clients as instances of the applications.

In one or more embodiments, applications may vary in different embodiments, but in certain embodiments, applications may be custom developed or commercial (e.g., off-the-shelf) applications that a user desires to execute in the source node (110). In one or more embodiments, applications may be logical entities executed using computing resources of the source node (110). For example, applications may be implemented as computer instructions, e.g., computer code, stored in persistent storage that when executed by a processor(s) of a computing device (e.g., 400, FIG. 4) cause the computing device to provide the functionality of the applications described throughout this application.

In one or more embodiments, while performing, for example, one or more operations requested by a user, applications installed on the source node (110) may include functionality to request and use physical and logical components (discussed below) of the source node (110). The applications may perform other types of functionalities not listed above without departing from the scope of the invention. In one or more embodiments, while providing application services to a user, applications may store data that may be relevant to the user in storage/memory resources (discussed below) of the source node (110).

In one or more embodiments, in order to provide the above-mentioned application services to a user, applications may need to communicate with one another with a minimum amount of latency. For this reason, in most cases, RESTful APIs (also referred to herein as "REST APIs") are used for communications between applications. As used herein, a "REST API" is an interface that two computing devices use to exchange data securely over the Internet. More specifically, the term "REST" defines a set of rules and constraints (not a protocol or a standard) that need to be followed when building the services. Any application that adheres to those rules and constraints will be able to communicate via a set of uniform, shared, and stateless (or stateful) operators and requests. APIs denote the underlying code that, if it conforms to the set of rules and constraints, allows the applications to communicate with one another.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate an application's connection (e.g., access) to one another. In general, the application performing the accessing is called "the client", and the application containing a resource is called "the server".

In operation, REST APIs use Hypertext Transfer Protocol (HTTP) to communicate. More specifically, REST APIs communicate via HTTP to perform standard database functions such as creating, reading, updating, and deleting records within a resource. For example, a well-designed REST API is similar to a webpage executing on a web browser with built-in HTTP functionality.

As used herein, "HTTP" is a request/response protocol that is used in cases in which a synchronous request/response is required. This means that applications (e.g., services) making requests via REST APIs must be designed to expect an immediate response. If the client receiving the response is down, the sending service may be blocked while it awaits for the response. To prevent this, failover and error handling logic may be applied to (e.g., built into) both applications.

In one or more embodiments, there may be four HTTP requests (e.g., methods): (i) "get" requests, (ii) "post" requests, (iii) "put" requests, and (iv) "delete" requests. In one or more embodiments, users may use "get" requests to access resources that are located at a specified uniform resource locator (URL) on a server. They may cache "get"

requests and send parameters in a REST API request to instruct the server to filter data before sending. Users may use "post" requests to send data to the server, in which sending the same "post" request multiple times may have a side effect of creating the same resource multiple times. Further, users may use "put" requests to update existing resources on the server. Unlike "post", sending the same "put" request multiple times in a RESTful web service may give the same result. Users may also use "delete" requests to remove the resource. A "delete" request may change the server state; however, if a user does not have appropriate authentication, the "delete" request may fail.

In one or more embodiments, in order to facilitate the communication between applications, two types of REST APIs (e.g., stateless REST APIs and stateful REST APIs) may be used. As used herein, a "state" of a REST API (or an application, for example) specifies its condition or quality of being at a given point in time. In most cases, whether a REST API is stateful or stateless depends on how long the state of interaction is being recorded and how that information needs to be stored.

In a REST API architecture, "statelessness" refers to a communication method in which the server completes every user request independently of all previous requests. In this architecture, users may request resources in any order, and every request is stateless or isolated from other requests (e.g., there is no stored knowledge of or reference to past transactions and each request is separate and unconnected). This REST API design constraint implies that servers may completely understand and fulfill each request every time (e.g., each request needs to include all the information necessary to initiate processing). Said another way, stateless REST APIs do not require any server-side sessions and applications are not allowed to store any data related to the requests.

In most cases, stateless applications may provide one service (or function) and use content delivery network, web, or print servers to process these "short-term" requests. An example of a stateless transaction may be an online search operation performed by a user. The user may type a question into a search engine and then hit enter. If this operation is interrupted or ended accidentally, the user may need to start a new operation. This indicates that (i) these two API calls are not dependent on each other and (ii) the result of the first API call do not need to be considered to make the second API call.

Further, in the REST API architecture, "statefulness" refers to a communication method in which a current request may be affected by the context of previous requests (e.g., by what happened during previous transactions). This REST API design constraint implies that stateful applications (and processes) may be executed based on the context of previous transactions. For this reason, stateful applications may use the same servers each time they process a request(s) from a user (e.g., a second API call may take a state from a result of a first API call). In this manner, when a stateful transaction is interrupted, the user may continue (more or less) from the point where the user left off because the context and history (e.g., a window location, a setting preference, a recent activity, etc.) have already been stored.

In one or more embodiments, in order to provide computer-implemented services, the source node (110) may include a collection of physical components (e.g., processing resources, storage/memory resources, networking resources, etc.) configured to perform operations of the source node (110) and/or otherwise execute a collection of logical components (e.g., applications, virtualization resources, etc.) of the source node (110).

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), etc.

As used herein, a "CPU" may refer to an electronic circuitry that may execute operations specified by an application. A CPU may perform an operation based on the following three steps: (i) fetching instructions related to an operation from the storage/memory resources, (ii) analyzing the fetched instructions, and (iii) performing the operation based on the analysis. In one or more embodiments, an operation may be, for example (but not limited to): comparing numbers, performing a function, displaying a video, etc.

As used herein, a "GPU" may refer to an electronic circuitry that may provide parallel data processing capabilities to generate enhanced, real-time graphics and to perform accelerated computing tasks (which is particularly useful for machine learning (ML) operations). In one or more embodiments, a GPU may include, for example (but not limited to): a graphics memory controller, a video processing engine, a graphics and computation engine, etc.

As used herein, a "DPU" may refer to an electronic circuitry that may perform accelerated data processing and optimized data movement data within each node. In one or more embodiments, the DPU may include, for example (but not limited to): a high-speed (e.g., 200 gigabits per second (200 Gbps)) networking interface, dynamic RAM (DRAM), a multi-core (e.g., 8-core) CPU, programmable acceleration engines (particularly for ML, security, and telecommunications purposes), etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

As used herein, "storage" may refer to a hardware component that is used to store data (e.g., application data) in each node. Storage may be a physical computer readable medium. In most cases, storage may be configured as a storage array (e.g., a network attached storage array), in which a storage array may refer to a collection of one or more physical storage devices. Each physical storage device may include non-transitory computer readable storage media, in which the data may be stored in whole or in part, and temporarily or permanently.

As used herein, "memory" may be any hardware component that is used to store data in each node. The data stored may be accessed almost instantly (e.g., in milliseconds (ms)) regardless of where the data is stored in memory. The memory may provide the above-mentioned instant data access because the memory may be directly connected to a CPU on a wide and fast bus (e.g., a high-speed internal connection that transfers data among hardware components of the node).

In one or more embodiments, application data may include, for example (but not limited to): a list of instructions, one or more application logs, etc. In one or more embodiments, application logs may include, for example (but not limited to): a setting of an application, a warning/an error (e.g., unknown software exception (0xc00d) occurred in the application at location 0x0007d) occurred in an application, a version of an application, a version of an OS, a display resolution configuration of a client, a type of an OS (e.g., a workstation OS), an identifier of an OS (e.g., Microsoft® Windows), a product identifier of an application, etc.

In one or more embodiments, a "setting of an application" may refer to a current setting that is being applied to an application either by a user or by default. A setting of an application may include, for example (but not limited to): a display option (e.g., a two-sided view) that is selected by a user, a font option that is selected by a user, an inbox folder setting of an electronic mail exchange application, a microphone setting of an application, a background setting of an application, etc.

In one or more embodiments, the source node (110) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to (i) provide memory protection (e.g., allowing only certain applications to access memory) and (ii) provide cache control and bus arbitration.

In one or more embodiments, while applications provide computer-implemented services to the clients, the applications may store data that may be relevant to the clients to the storage/memory resources. When the client-relevant data is stored, the client-relevant data may be subjected to loss, inaccessibility, or other undesirable characteristics based on the operation of the storage/memory resources.

To mitigate, limit, and/or prevent such undesirable characteristics, users of the clients may enter into agreements (e.g., service level agreements) with providers (e.g., vendors) of the storage/memory resources. These agreements may limit the potential exposure of client-relevant data to undesirable characteristics. These agreements may, for example, require duplication of client-relevant data to other locations so that if the storage/memory resources fail, another copy (or other data structure usable to recover the data on the storage/memory resources) of the client-relevant data may be obtained. These agreements may specify other types of activities to be performed with respect to the storage/memory resources without departing from the invention.

In one or more embodiments, each application may include a virtual address space. A virtual address space may be a simulated range of addresses (e.g., identifiable locations) that mimics physical locations of one or more physical components of the source node (110). In most cases, an application is not configured to identify the physical locations of the components; rather, the application relies on other components of the source node (110) to translate one or more virtual addresses of the virtual address space to one or more physical addresses of the physical components. Accordingly, in one or more embodiments, an application may utilize a virtual address space to read, write, and/or otherwise manipulate data, without being configured to directly identify the physical address of that data within the physical components of the source node (110).

Further, each application may communicate with other components of the source node (110) to establish a mapping between a virtual address space and the physical components of the source node (110). In one or more embodiments, when a mapping is established, an application's use of the virtual address space enables the application to directly manipulate data in the physical components, without relying on other components of the source node (110) to repeatedly update mappings between the virtual address space and the physical addresses of the physical components of the source node (110).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may provide capabilities to interface the source node (110) with external entities (e.g., the target node (130), the clients, etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transmission control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the source node (110) and the external entities. For example, a networking resource may enable the source node (110) to be operatively connected, via Ethernet, using a TCP protocol to form a "network fabric", and may enable the communication of data between the source node (110) and the external entities. In one or more embodiments, the source node (110) may be given a unique identifier (e.g., an Internet Protocol (IP) address) to be used when utilizing the above-mentioned protocols.

Further, a networking resource, when using a certain protocol or a variant thereof, may support streamlined access to storage/memory media of other nodes. For example, when utilizing remote direct memory access (RDMA) to access data on another node, it may not be necessary to interact with the logical components of that node. Rather, when using RDMA, it may be possible for the networking resource to interact with the physical components of that node to retrieve and/or transmit data, thereby avoiding any higher-level processing by the logical components executing on that node.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU, a virtual storage pool, etc.

As an example, a VM may be executed using computing resources of the source node (110). The VM (and applications hosted by the VM) may generate data (e.g., VM data) that is stored in the storage/memory resources of the source node (110), in which the VM data may reflect a state of the VM. In one or more embodiments, the VM may provide services to clients, and may host instances of databases, email servers, or other applications that are accessible to the clients.

In one or more embodiments, a virtualization resource may include a hypervisor, in which the hypervisor may be configured to orchestrate an operation of a VM by allocating computing resources of the source node (110) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions, e.g., computer code, stored on storage/memory resources of the source node (110) that when executed by processing resources of the source node (110) cause the source node (110) to provide the functionality of the hypervisor.

Figure 4:
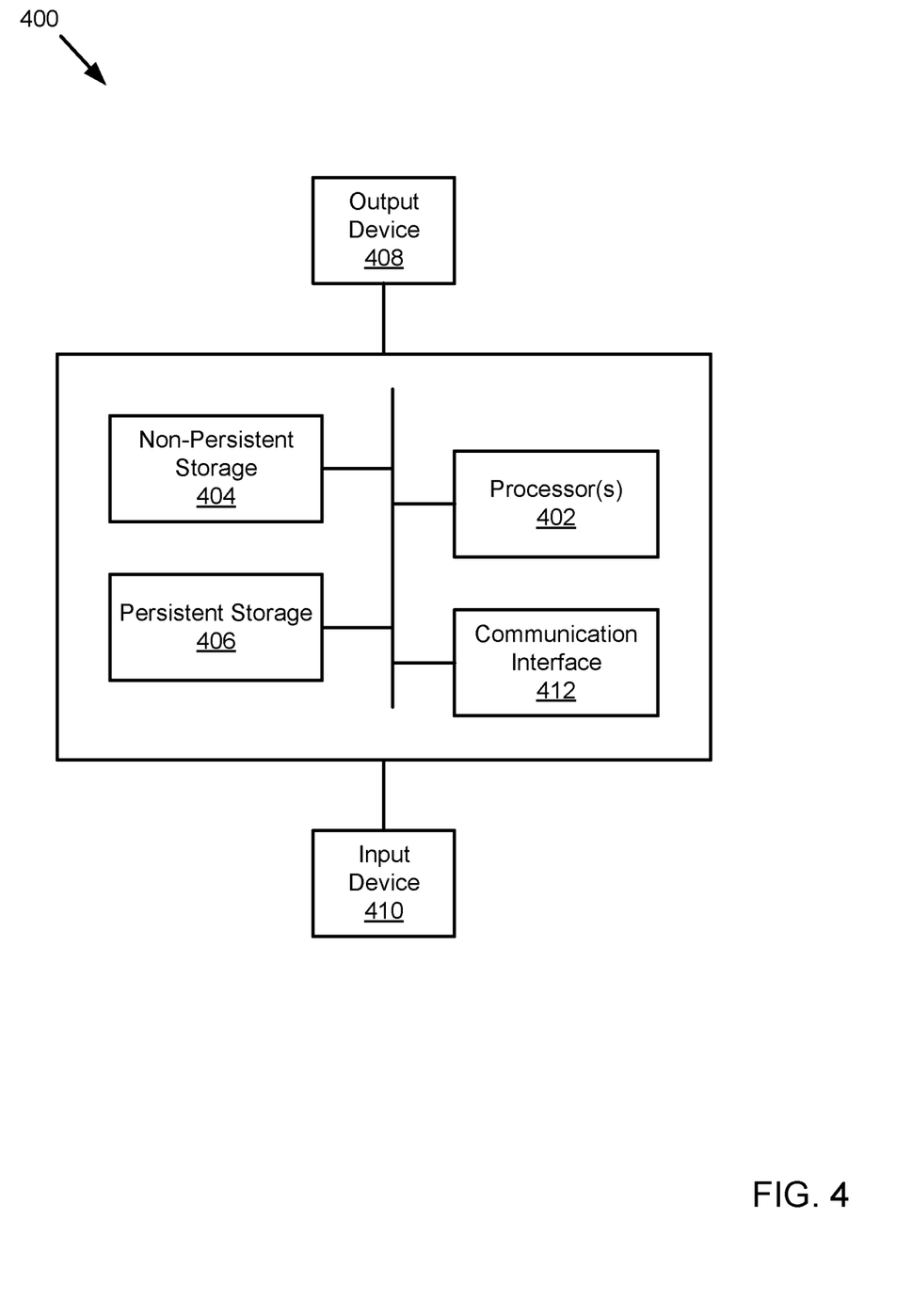
FIG. 4 shows a diagram of a computing device in accordance with one or more embodiments of the invention.

In one or more embodiments, the source node (110) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the source node (110) described throughout this application.

Alternatively, in one or more embodiments, the source node (110) may be implemented as a logical device. The logical device may utilize the computing resources of any number of computing devices to provide the functionality of the source node (110) described throughout this application.

As used herein, "network traffic" is an amount of data moving across a network (e.g., 120) at any given time. For example, in search engine optimization, network traffic may be characterized as being either direct, organic, or paid, in which (i) direct network traffic may be initiated when a user types a website's URL in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

In one or more embodiments, similar to the source node (110), the target node (130) may also, for example (but not limited to): be configured for hosting and maintaining various workloads, be configured for providing a computing environment whereon workloads may be implemented, participate in a collaborative workload placement, be an enterprise server, be a modular server, include physical and logical components, include different types of OSs, include any number of applications, etc.

In one or more embodiments, the target node (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the target node (130) described throughout this application.

Alternatively, in one or more embodiments, similar to the source node (110), the target node (130) may also be implemented as a logical device.

In one or more embodiments, the recovery module (140) includes functionality for managing the recovery process of the source node (110). To perform the functionality, the recovery module (140) may include a monitoring component (142), an event database (144), an analyzing component (146), and a remediating component (148). The recovery module (140) may include additional, fewer, and/or different components without departing from the invention.

In one or more embodiments, the monitoring component (142) includes functionality for monitoring the source node (110) to see that the recovery process is initiated. The monitoring component (142) may further include functionality for monitoring the progress of the recovery progress and to track the events that occur during the recovery process. Examples of events include, but are not limited to: an initiation of a migration, a predetermined number of packets have been transmitted, a network channel is selected for the transmission of packets, a number of packets have been dropped, a network connection between the source node (110) and the target node (130) is lost, and the migration is complete.

In one or more embodiments, the events tracked by the monitoring component (142) are tracked by generating event entries each associated with an event. The event entries may be stored in the event database (144). In one or more embodiments, the event database (144) is a data structure that stores the event entries. Each event entry may specify the corresponding event and a timestamp.

In one or more embodiments, the analyzing component (146) includes functionality for analyzing the event entries. The analyzing component (146) may use the event entries to determine if a failure event has occurred. In one or more embodiments, a failure event is an event that prevents the recovery process from completing. Examples of failure events include, but are not limited to: a failed connection between the source node (110) and the target node (130), a high frequency of dropped packets during the migration, a reboot of either the source node (110) or the target node (130), a failure of either the source node (110) or the target node (130).

Figure 22:
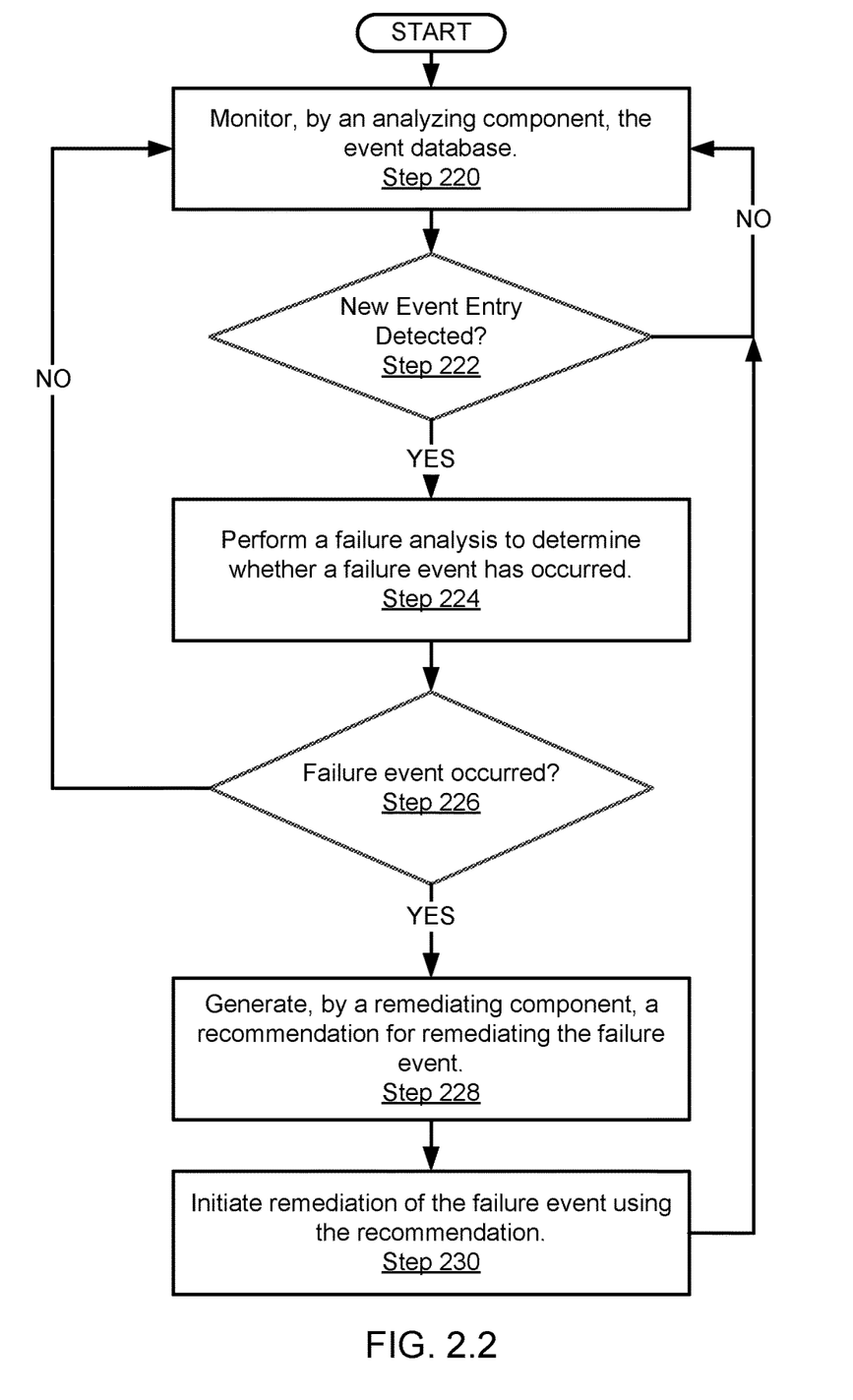

In one or more embodiments, the remediating component (148) includes functionality for remediating any detected failure events by the analyzing component (146). The remediating component (148) performs the remediation in accordance with, e.g., FIG. 2.2.

In one or more embodiments, the recovery module (140), or any components therein, may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the recovery module (140) (or any components therein) described throughout this application.

Alternatively, in one or more embodiments, similar to the source node (110), the (140) (or any components therein) may also be implemented as logical devices.

In one or more embodiments, the network (120) may represent a computing network configured for computing resource and/or messages exchange among registered computing hosts (i.e., the nodes (110, 130), the clients, etc.). As discussed above, components of the system (100) may operatively connect to one another through the network (120) (e.g., a local area network (LAN), a wide area network (WAN), a mobile network, a wireless LAN (WLAN), etc.). In one or more embodiments, the network (120) may be implemented using any combination of wired and/or wireless connections. Further, the network (120) may enable interactions between the nodes (110, 130) and the clients through any combination of wired and/or wireless network protocols (e.g., TCP, UDP, Internet Protocol version 4 (IPv4), etc.).

The network (120) may encompass various interconnected, network-enabled subcomponents (not shown) (e.g., switches, routers, gateways, cables etc.) that may facilitate communications between the components of the system (100).

In one or more embodiments, the network-enabled subcomponents may be capable of: (i) performing one or more communication schemes (e.g., IP communications, Ethernet communications, etc.), (ii) being configured by one or more nodes (e.g., 130, 150, etc.) in the network (120), and (iii) limiting communication(s) on a granular level (e.g., on a per-port level, on a per-sending device level, etc.).

In one or more embodiments, before communicating data over the network (120), the data may first be broken into smaller batches (e.g., data packets) so that larger size data can be communicated efficiently. For this reason, the network-enabled subcomponents may break data into data packets. The network-enabled subcomponents may then route each data packet in the network (120) to distribute the network traffic uniformly.

In one or more embodiments, the network-enabled subcomponents may decide how real-time (e.g., on the order of ms or less) network traffic and non-real-time network traffic should be managed in the network (120). In one or more embodiments, the real-time network traffic may be high priority (e.g., urgent, immediate, etc.) network traffic. For this reason, data packets of the real-time network traffic may need to be prioritized in the network (120). The real-time network traffic may include data packets related to, for example (but not limited to): videoconferencing, web browsing, voice over Internet Protocol (VOIP), etc.

In one or more embodiments, the non-real-time network traffic may be low priority (e.g., non-urgent) network traffic. For this reason, data packets of the non-real-time network traffic may not need to be prioritized in the network (120). The non-real-time network traffic may include data packets related to, for example (but not limited to): File Transfer Protocol (FTP) for web publishing, email applications, etc.

Figure 21:
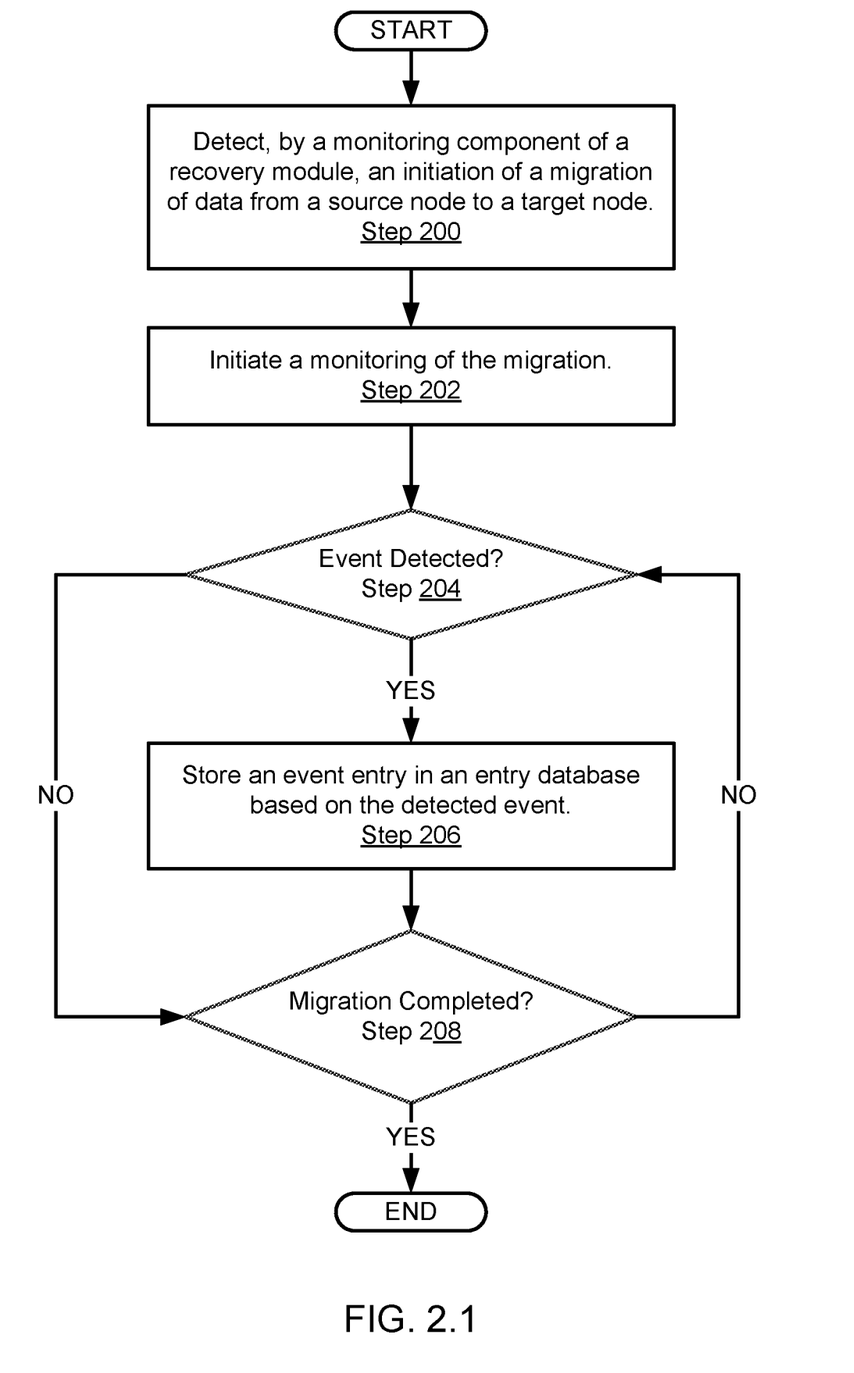

FIG. 2.1 shows a method for tracking events of a recovery process in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 2.1, the method shown in FIG. 2.1 may be executed by, for example, the above-discussed recovery module (e.g., 140, FIG. 1). Other components of the system (100) illustrated in FIG. 1 may also execute all or part of the method shown in FIG. 2.1 without departing from the scope of the invention.

In step 200, a monitoring component of the recovery module detects an initiation of a migration of data from a source node to a target node. In one or more embodiments, the initiation is detected based on an API installed in the source node that provides monitoring capabilities to the monitoring component. After the monitoring component detects the initiation, an event entry is stored in the event database that specifies the migration has initiated.

In step 202, a monitoring of the migration is initiated. In one or more embodiments, the monitoring includes tracking events that occur associated with the migration. The monitoring may be performed using APIs calls on the applications of the source node. Further, the monitoring may be performed based on a monitoring of network cards of the source device to determine that data is being transmitted to a target node for the purpose of a migration.

In step 204, a determination is made about whether an event is detected by the monitoring component. If an event is detected, the method proceeds to step 206; otherwise, the method proceeds to step 208.

In step 206, following the determination that an event is detected, an event entry associated with the event is generated and stored in the event database. In one or more embodiments, the event entry is generated by specifying the event, the timestamp, and including such information in the event entry. As discussed above, an example of an event includes, but is not limited to: a predetermined number of packets have been transmitted, a network channel is selected for the transmission of packets, a number of packets have been dropped, a network connection between the source node and the target node is lost, and a new migration (e.g., a migration of data from the source node to a new target node) is initiated.

In step 208, a determination is made about whether the migration is completed. If the migration is completed, the method ends following step 208; otherwise, the method proceeds to step 204.

In one or more embodiments, after the migration is completed, an event entry may be generated that specifies the completion of the migration and a timestamp associated with the completion.

FIG. 2.2 shows a method for analyzing and remediating a failure event in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 2.2, the method shown in FIG. 2.2 may be executed by, for example, the above-discussed recovery module (e.g., 140, FIG. 1). Other components of the system (100) illustrated in FIG. 1 may also execute all or part of the method shown in FIG. 2.2 without departing from the scope of the invention.

Turning to FIG. 2.2, in step 220, the event database is monitored by an analyzing component of the recovery module.

In step 222, a determination is made about whether a new event entry is detected. If a new event entry is detected, the method proceeds to step 224; otherwise, the method returns to step 220.

In step 224, a failure analysis is performed on the event entries in the event database to determine whether a failure event has occurred. In one or more embodiments, the failure analysis is a process for reading one or more event entries (including the new event entry) and analyzing the information of the corresponding event(s) to determine if one of the events is a failure event. The determination may be based on predetermined definitions of types of failure event. For example, one type of failure events may include a threshold percentage of packets that have been attempted have been dropped. The failure analysis may include determining that, based on the transmitted packets and dropped packets tracked via the event entries, the threshold percentage has been reached and/or exceeded.

A second example of a type of failure is a lost connection between the source node and one of the target nodes. The failure analysis may include detecting that the new event entry specifies the lost connection.

A third example of a type of failure is an operational failure of either the source node or the target node. The failure analysis may include detecting that the new event entry specifies the operational failure.

In step 226, a determination is made about whether a failure event occurred. If a failure event occurred, the method proceeds to step 228; otherwise, the method returns to step 220.

In step 228, following the determination that a failure event occurred, a recommendation is made to remediate the failure event. In one or more embodiments, the recommendation is made based on a predetermined association between the type of failure of the failure event and the recommendation. For example, if a detected failure event includes that a high percentage of transmitted packets are dropped, an associated recommendation may include reducing the size of the packets. As a second example, if the failure event includes a lost connection between the source node and the target node, an associated recommendation may include finding a new network channel between the source node and the target node and providing the network channel to the source node. In another example, if the failure event includes an operational failure of the target node, the associated recommendation may include identifying one or more new target nodes (e.g., in the same or in a different target environment to the original target node) and providing network channel(s) to the new target node(s).

In step 230, a remediation is initiated using the recommendation. In one or more embodiments, the remediation includes implementing the recommendation determined in step 228. Specifically, a remediating component of the recovery module may send requests to the source node that specifies the recommendation. In one example, the remediation is initiated by sending a request to the source node for initiating a new migration with a new target node and providing a new network channel to the new target node. In another example, the remediation is initiated by sending a request to the source node for initiating a network channel with the original target node and providing a new network channel to connect to the original target node. In another example, the remediation is initiated by sending a request to the source node for re-initiating the migration and modifying the size of packets transmitted in the new migration.

The method may return to step 220 after step 230.

Start of Example

Figure 31:
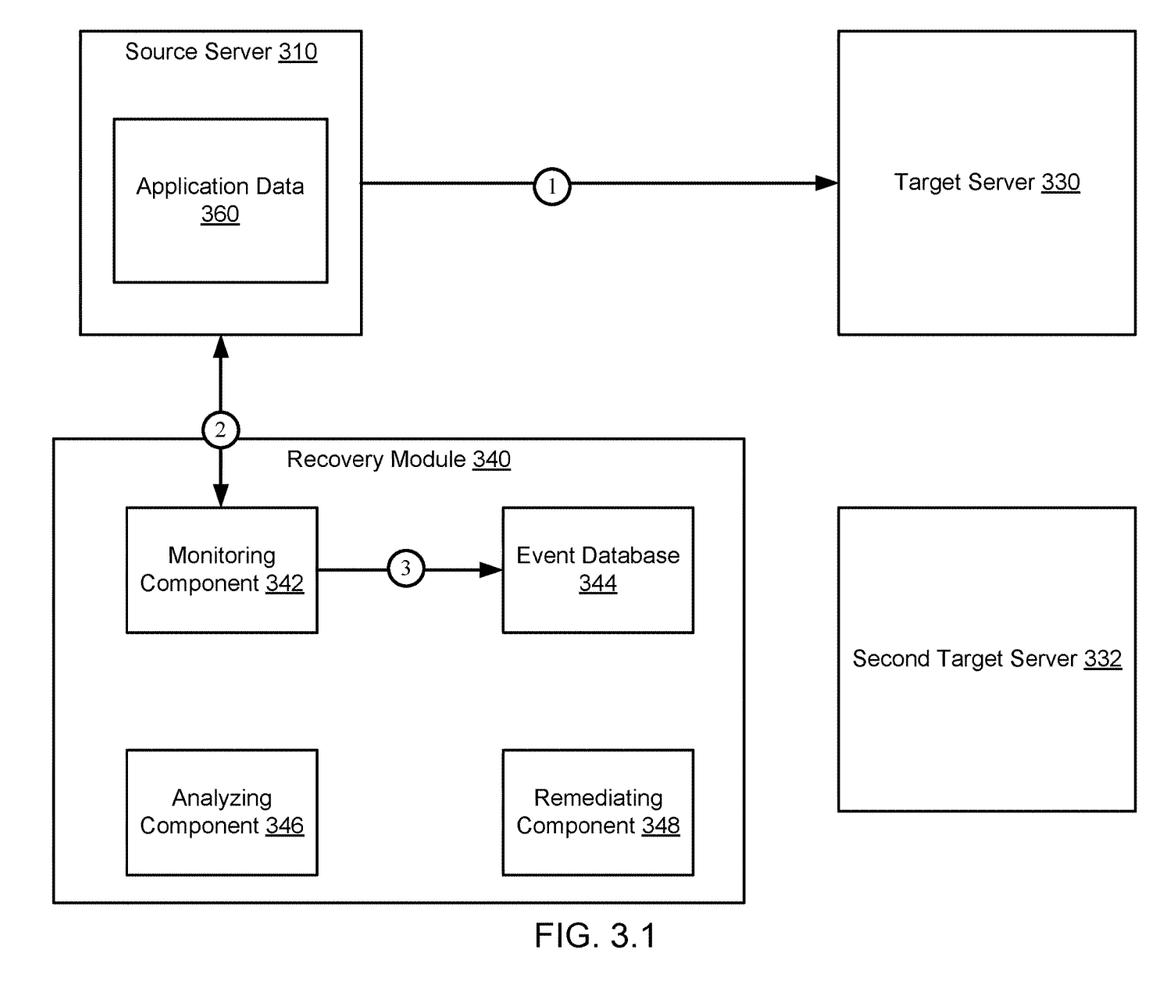
Figure 32:
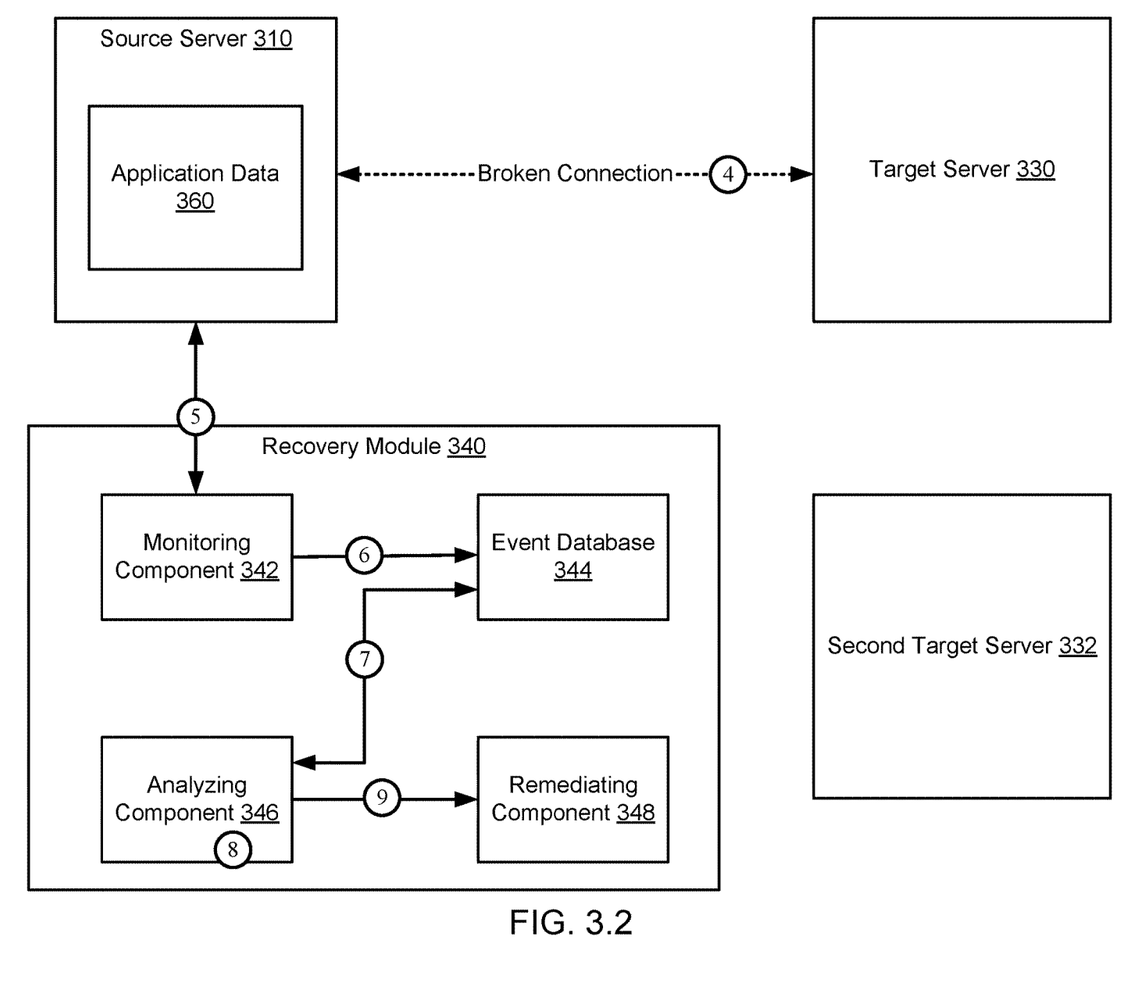
Figure 33:
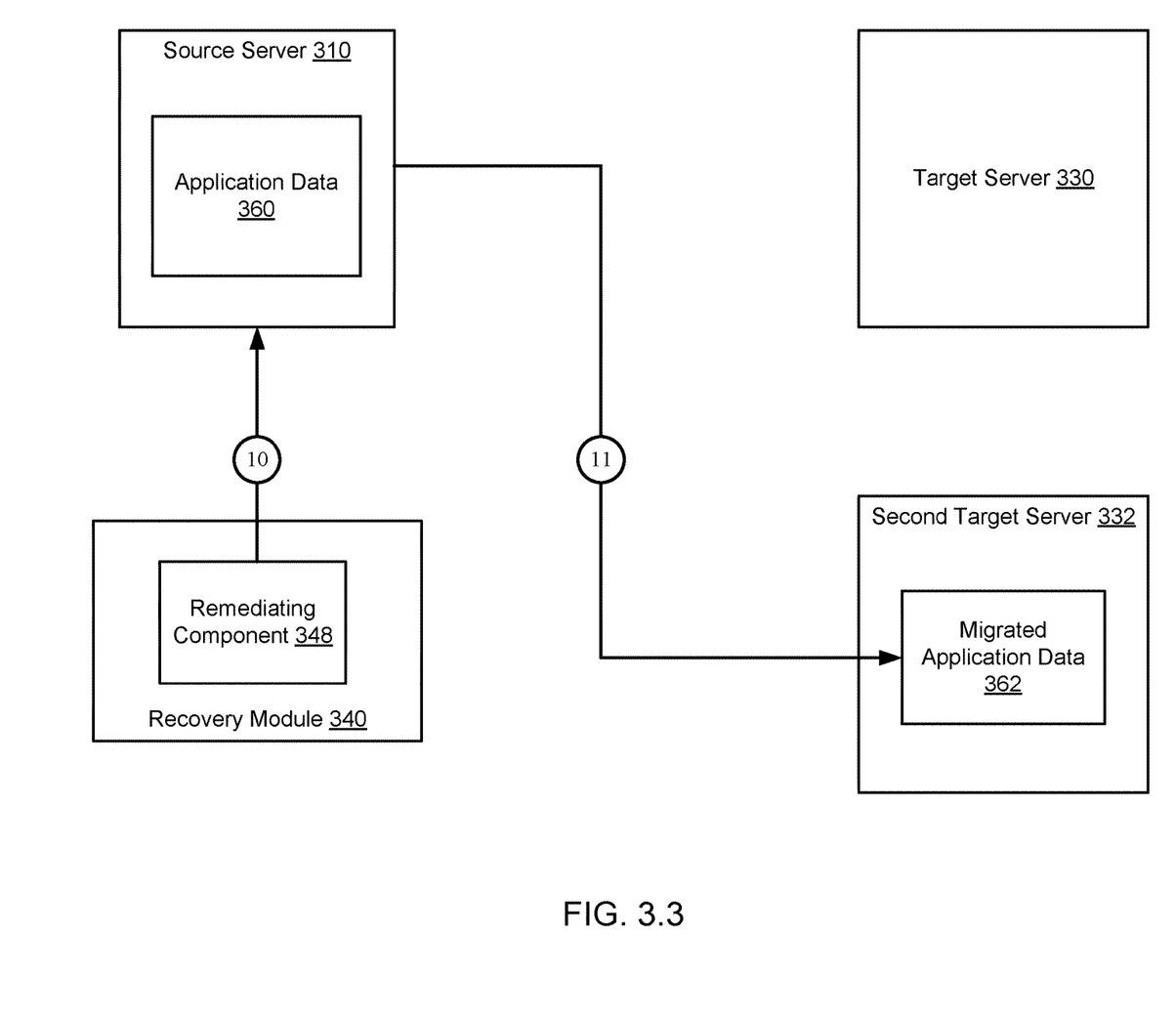

The following section describes an example of one or more embodiments. The example, illustrated in FIGS. 3.1-3.3, is not intended to limit the scope of the embodiments disclosed herein and is independent from any other examples discussed in this application. Actions performed in FIGS. 3.1-3.3 may be illustrated with circled numbers and described below with bracketed numbers (e.g., "[1]").

Turning now to FIG. 3.1, consider a scenario in which a migration of data is initiated. FIG. 3.1 shows a diagram of an example system. The example system includes a source server (310), a target server (330), a second target server (332), and a recovery module (340). For the sake of brevity, not all components of the example system may be illustrated in FIG. 3.1.

The source server (310) determines a scheduled migration is due. The source server (310) initiates the migration of data from the source server (310) to the target server (330) [1]. In this example, the source server is part of a source environment (not shown) that is on premise to the clients that are serviced, and the target servers (330, 332) are part of a cloud environment accessible via a wide area network (not shown) such as the Internet.

A monitoring component (342) of the recovery module (340) detects the initiated migration based on a monitoring done on the source server (310) [2]. Based on the detecting, the monitoring component (342) stores an event entry in an event database of the recovery module (340) [3]. The first event entry specifies the initiated migration and a timestamp in which it was detected.

Turning to FIG. 3.2, at a later point in time, the connection is lost between the source server (310) and the target server (330) [4]. The broken connection may be caused by an operational failure of the target server (330). The monitoring component (342) detects this event [5]. The monitoring component (342) generates and stores a second event entry based on the detected event [6].

An analyzing component (346) of the recovery module has been monitoring the event database (344) to search for failure events. After the second event entry is stored in the event database (344), the analyzing component detects the second event entry [7]. The analyzing component (346) performs the method of FIG. 2.2 to determine that the second event entry indicates a failure event [8]. Based on this determination, the analyzing component (346) sends a request to a remediating component (348) of the recovery module (340) for remediating this failure event [9].

Turning now to FIG. 3.3, the remediating component (348) applies the method of FIG. 2.2 to determine a recommendation for remediating the failure event. In this example, the determined recommendation is to initiate a new migration of the application data (360) to the second target server (332). Based on this recommendation, the remediating component (348) sends a request to the source server (310) that specifies initiating a new migration to the second target server (332) [10]. The request provides the new network channel through which the application data (360) is transmitted.

In response to obtaining the request, the source server (310) initiates a new migration of the application data (360) to the second target server (332) using the provided network channel [11]. The migrated application data (362) is stored in the second target server (332). The source server (310) may specify the new services of the second target server (332) to the clients (not shown) so that any new operations may be performed via the second target server (332).

End of Example

Turning now to FIG. 4, FIG. 4 shows a diagram of a computing device in accordance with one or more embodiments of the invention.

In one or more embodiments of the invention, the computing device (400) may include one or more computer processors (412), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A system comprising:
a source device operating on a first computing device;
a target device operating on a second computing device;
a recovery module comprising: a monitoring component, an analysis component, an event database, and a remediating component,
wherein the recovery module is operably connected to the source device and the target device via a network,
wherein the monitoring component is programmed to:
monitor the source device to detect an initiation of a recovery process, wherein the recovery process is migration of application data from the source device to the target device,
wherein the recovery process is initiated by the source device, and
wherein the application data comprises configurations for a stateful environment of applications executing on the source device that provide stateful services to a user;
wherein the analysis component is programmed to:
monitor the event database to detect a new event entry, wherein the new event entry is associated with the recovery process of the source device;
make a determination that the new event entry is associated with a failure event;
based on the determination, provide the new event entry to a remediating component;
wherein the remediating component is programmed to:
obtain a recommendation for remediation based on the failure event,
wherein obtaining the recommendation comprises:
identifying a type of failure for the failure event, wherein the type of failure is a predefined percentage of dropped packets during the migration of the application data; and
identifying the recommendation associated with the type of failure; and
initiate the remediation based on the recommendation for remediation,
wherein the remediation comprises adjusting a packet size of packets sent during the migration of the application data, and
wherein initiating the remediation comprises sending, during the migration of the application data, a remediation request to the source device that specifies re-initiating the migration reducing the packet size of the packets to reduce a percentage of dropped packets below the predefined percentage of dropped packets.

2. The system of claim 1, wherein the monitoring component is further programmed to:
initiate a monitoring of the source device during the recovery process;
generate, based on the monitoring during the recovery process, the new event entry during the recovery process; and
store the new event entry in the event database.

3. A method for managing a recovery process, comprising:
monitoring, by a monitoring component of a recovery module, a source device to detect an initiation of the recovery process,
wherein the recovery process is migration of application data from the source device to a target device,
wherein the source device and the target device are operatively connected to the recovery module, wherein the recovery process is initiated by the source device, and wherein the application data comprises configurations for a stateful environment of applications executing on the source device that provide stateful services to a user;

monitoring, by an analyzing component of the recovery module, an event database to detect a new event entry, wherein the new event entry is associated with the recovery process of the source device;

making a determination that the new event entry is associated with a failure event;

based on the determination, obtaining a recommendation for remediation based on the failure event, wherein obtaining the recommendation comprises:
identifying a type of failure for the failure event,
wherein the type of failure is a predefined percentage of dropped packets during the migration of the application data; and
identifying the recommendation associated with the type of failure; and initiating the remediation based on the recommendation for remediation,
wherein the remediation comprises adjusting a packet size of packets sent during the migration of the application data, and
wherein initiating the remediation comprises sending, during the migration of the application data, a remediation request to the source device that specifies re-initiating the migration reducing the packet size of the packets to reduce a percentage of dropped packets below the predefined percentage of dropped packets.

4. The method of claim 3, further comprising:
initiating a monitoring of the source device during the recovery process;
generating, based on the monitoring during the recovery process, the new event entry during the recovery process; and
storing the new event entry in the event database.

5. A non-transitory computer readable medium comprising computer readable program code, which when executed by a computer processor enables the computer processor to perform a method for managing a recovery process, the method comprising:
monitoring, by a monitoring component of a recovery module, a source device to detect an initiation of the recovery process,
wherein the recovery process is migration of application data from the source device to a target device,
wherein the source device and the target device are operatively connected to the recovery module,
wherein the recovery process is initiated by the source device, and
wherein the application data comprises configurations for a stateful environment of applications executing on the source device that provide stateful services to a user;

monitoring, by an analyzing component of the recovery module, an event database of the recovery module to detect a new event entry, wherein the new event entry is associated with the recovery process of the source device;

making a determination that the new event entry is associated with a failure event;

based on the determination, obtaining a recommendation for remediation based on the failure event, wherein obtaining the recommendation comprises:
identifying a type of failure for the failure event,
wherein the type of failure is a predefined percentage of dropped packets during the migration of the application data; and
identifying the recommendation associated with the type of failure; and initiating the remediation based on the recommendation for remediation,
wherein the remediation comprises adjusting a packet size of packets sent during the migration of the application data, and
wherein initiating the remediation comprises sending, during the migration of the application data, a remediation request to the source device that specifies re-initiating the migration reducing the packet size of the packets to reduce a percentage of dropped packets below the predefined percentage of dropped packets.

6. The non-transitory computer readable medium of claim 5, the method further comprising:
initiating a monitoring of the source device during the recovery process;
generating, based on the monitoring during the recovery process, the new event entry during the recovery process; and
storing the new event entry in the event database.

* * * * *